US009462323B1

United States Patent
Goldberg et al.

(10) Patent No.: US 9,462,323 B1
(45) Date of Patent: Oct. 4, 2016

(54) METHOD AND SYSTEM FOR DISPLAY OF MIXED MEDIA CONTENT ON DEVICES WITHOUT STANDARD VIDEO

(71) Applicant: Steamray Inc., Campbell, CA (US)

(72) Inventors: Joshua Gouled Goldberg, Santa Cruz, CA (US); David Paul Struck, Sunnyvale, CA (US)

(73) Assignee: Steamray Inc., Campbell, CA (US)

( * ) Notice: Subject to any disclaimer, the term of this patent is extended or adjusted under 35 U.S.C. 154(b) by 0 days.

(21) Appl. No.: 14/838,641

(22) Filed: Aug. 28, 2015

(51) Int. Cl.
    *H04N 7/10*     (2006.01)
    *H04N 7/025*     (2006.01)
    *H04N 21/43*     (2011.01)
    *H04N 21/431*     (2011.01)
    *H04N 21/4782*     (2011.01)
    *H04N 21/81*     (2011.01)

(52) U.S. Cl.
    CPC ...... *H04N 21/4307* (2013.01); *H04N 21/4316* (2013.01); *H04N 21/4782* (2013.01); *H04N 21/812* (2013.01); *H04N 21/8106* (2013.01); *H04N 21/8153* (2013.01)

(58) Field of Classification Search
    USPC .......................................................... 725/32
    See application file for complete search history.

(56) References Cited

U.S. PATENT DOCUMENTS

| | | | | |
|---|---|---|---|---|
| 2007/0088712 | A1* | 4/2007 | Watson ................ | G09B 5/06 |
| 2009/0172736 | A1* | 7/2009 | Tsui .................... | H04N 5/44543 725/40 |
| 2013/0047074 | A1* | 2/2013 | Vestergaard ............ | G06F 3/14 715/234 |
| 2014/0282788 | A1* | 9/2014 | Inao .................... | H04N 21/8456 725/115 |
| 2015/0067739 | A1* | 3/2015 | Kelley ............. | H04N 21/47205 725/60 |

* cited by examiner

*Primary Examiner* — Brian T Pendleton
*Assistant Examiner* — Alexander Gee
(74) *Attorney, Agent, or Firm* — Venable LLP; Frank M. Gasparo; William A. Hector

(57) ABSTRACT

Aspects of the invention may involve systems and methods. A method for providing video and mixed media content to a user device may include receiving content data from a content source and broadcasting the state of the content source. The content data may be split into audio data and visual data. Snapshots of the visual data over a length of time may be extracted. The plurality of snapshots and the audio data may be transformed into text strings and packaged into a data object. In response to a request from a user device, the data object and browser executable instructions may be sent to the user device. The instructions may transform the text into sound and into image snapshots to be consecutively displayed in a browser, where the displayed snapshots is synchronized with the sound, and other media content is displayed in the browser.

20 Claims, 5 Drawing Sheets

METHOD AND SYSTEM FOR DISPLAY OF MIXED MEDIA CONTENT ON DEVICES WITHOUT STANDARD VIDEO

FIELD OF INVENTION

The invention relates to delivery of mixed media and more specifically to providing synchronous audio and video playback with separate media content in the same browser.

SUMMARY

Aspects of the invention may involve systems and methods. In one embodiment of the invention, a system may exist to provide video content. The system may include a media server configured to receive and broadcast streaming video from one or more audio and video sources; a data structure server in communication with the media server, the data structure server configured to publish a broadcast state for the one or more audio and video sources; an internal server in communication with the data structure server and the media server, the internal server configured to receive the video stream from the media server, the internal server comprising one or more processors configured to: separate the visual data and the audio data from the video stream, transform, for a given period of time, the audio data into a first string, extract, for the given period of time, a plurality of snapshots from the visual data, transform the plurality of snapshots into a second string, package the first string and the second string into a data object, wherein the audio of the first string and the snapshots of the second string are synchronized in time, and transmit the data object to the data structure server, wherein the data structure server publishes the data object; and an external server in communication with the data structure server, the external server configured to respond to a request from one or more user devices, a response including the data object and browser executable instructions to: transform the first string to a playable sound, transform the second string to consecutively display snapshots from the plurality of snapshots in a browser, wherein each of the displayed snapshots is synchronized with the playable sound, and display second media content along with the plurality of snapshots in the browser.

In another embodiment of the invention, a method and/or non-transitory computer readable medium storing instructions may exist to provide video and mixed media content. The method and/or instructions may include: receiving a connection request and content data from a content source; transmitting a broadcast state to a data structure server; publishing the broadcast state; transmitting the content data to an internal server; splitting the content data into audio data and visual data; transforming the audio data into a first string for a length of time; extracting a plurality of snapshots from the visual data over the length of time; transforming the plurality of snapshots into a second string; packaging the first string and the second string into a data object, wherein the audio of the first string and the snapshots of the second string are synchronized in time; publishing the data object, wherein the data object is accessible by an external server, wherein the external server is accessible by one or more user devices; and pushing a response to a request from one or more user devices, wherein the response includes the data object and browser executable instructions to: transform the first string to a playable sound, transform the second string to consecutively display snapshots from the plurality of snapshots in a browser, wherein each of the displayed snapshots is synchronized with the playable sound, and display second media content along with the plurality of snapshots in the browser.

BRIEF DESCRIPTION OF THE DRAWINGS

The foregoing and other features and advantages of the invention will be apparent from the following, more particular description of various embodiments, as illustrated in the accompanying drawings wherein like reference numbers generally indicate identical, functionally similar, and/or structurally similar elements. The first digits in the reference number indicate the drawing in which an element first appears.

DESCRIPTION OF THE EMBODIMENTS

Figure 1:
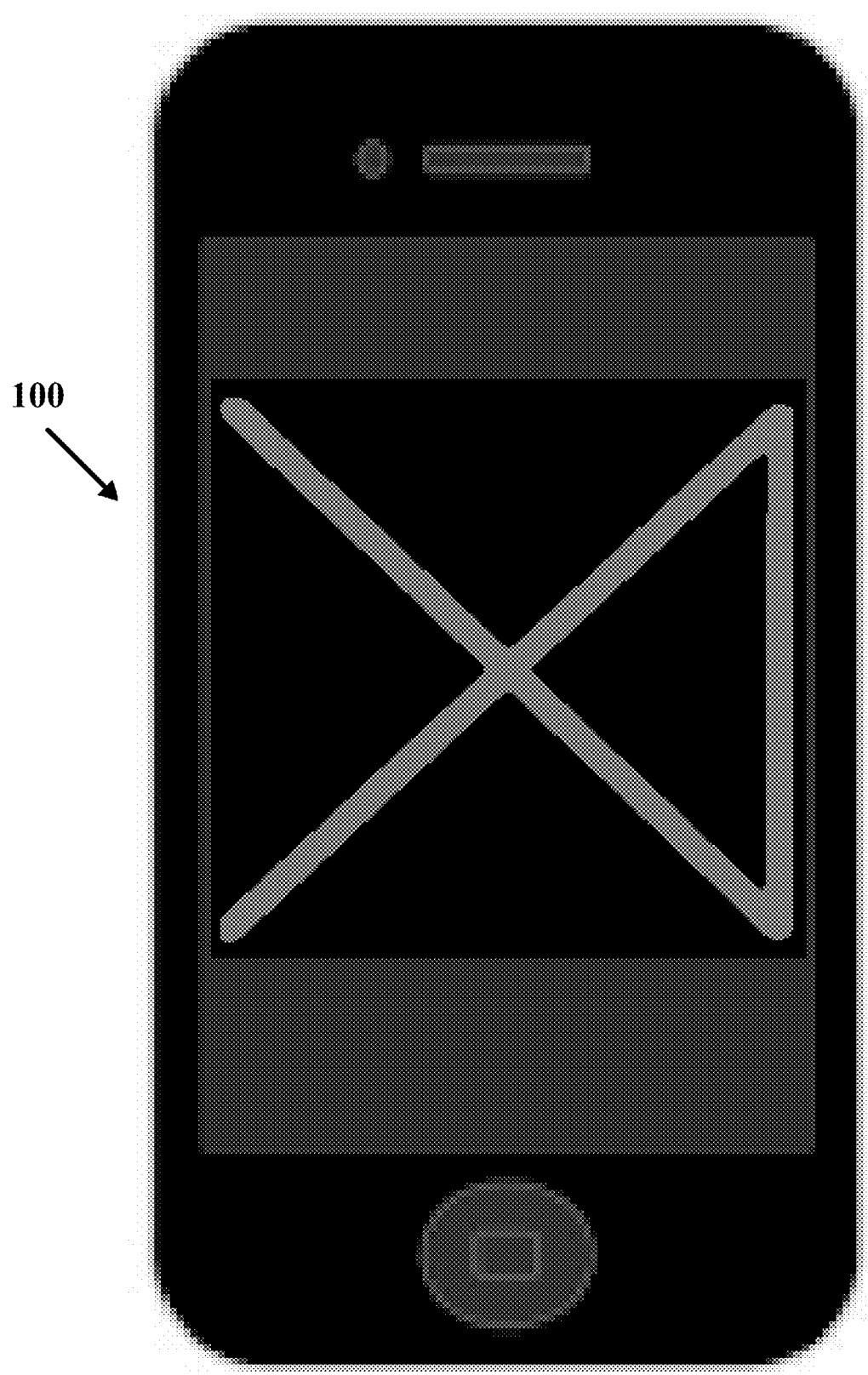
FIG. 1 depicts an example mobile device with full screen video playback.

Illustrative embodiments are discussed in detail below. While specific embodiments are discussed, it should be understood that this is done for illustration purposes only. In describing and illustrating the embodiments, specific terminology is employed for the sake of clarity. However, the embodiments are not intended to be limited to the specific terminology so selected. A person skilled in the relevant art will recognize that other components and configurations may be used without departing from the spirit and scope of the embodiments. It is to be understood that each specific element includes all technical equivalents that operate in a similar manner to accomplish a similar purpose. The examples and embodiments described herein are non-limiting examples.

As used herein, the term "a" refers to one or more. The terms "including," "for example," "such as," "e.g.," "may be" and the like, are meant to include, but not be limited to, the listed examples. The term "product" may refer to both products and services.

In an embodiment of the invention, the following example components may be provided or utilized. A media server may be provided to host streaming video software for broadcasting video streams to user devices. For example, the Wowza® streaming engine may be used in an embodiment. A data structure server may be provided to host a key-value cache system able to store data structures and/or data objects. In an embodiment, data structure server may be running a NoSQL database. For example, a server running Redis® software may be used in an embodiment. The data structure server may also include the ability to operate in a publisher/subscriber mode where data may be published to the system and subscribers may receive an event notification that data has published. Subscribers may also receive data with the event when the data is published. A video/audio encoder, may be used in an embodiment. For example, the software application FFMPEG® running on a server may be used as a video/audio encoder. The software video/audio encoder may receive an input stream and transcode the stream data to different audio/video formats (e.g., the video/audio encoder may convert multimedia files between various data formats). An embodiment of the invention may utilize modern native browser sound APIs for controlling audio on the web (e.g., adding effects to audio, creating audio visualizations, applying spatial effects (such as panning)). For example, Web Audio API may be used. One or more servers running one or more content processing software applications may be used to control content flow and process various types of media. The content processing software applications may be written in any programming language, such as, for example, Node.js®, a software language based on JavaScript allowing to program in JavaScript on a server.

Currently, in some devices, such as the iPhone® running iOS®, only full-screen video is available. Viewing embedded video in a webpage, for example, is not possible. When video data is received and/or played on an iPhone®, for example, the iPhone® video player is used to display the video and no separate video playback is available in a browser. For example, when video is requested from a webpage (e.g., YouTube®, etc.), the entire iOS® screen becomes occupied with the video player and additional content outside of the currently playing video is not available to be seen as the browser is a separate application that is hidden. The solutions described herein, allows simulated video in addition to other multimedia to be simultaneously present on a device screen. For example, simulated video could be displayed along with advertisements, textual information, and/or second or more simulated videos.

FIG. 1 depicts an example mobile device 100 with full screen video playback. The Apple® iPhone®, for example, displays video only in full screen mode.

Figure 2:
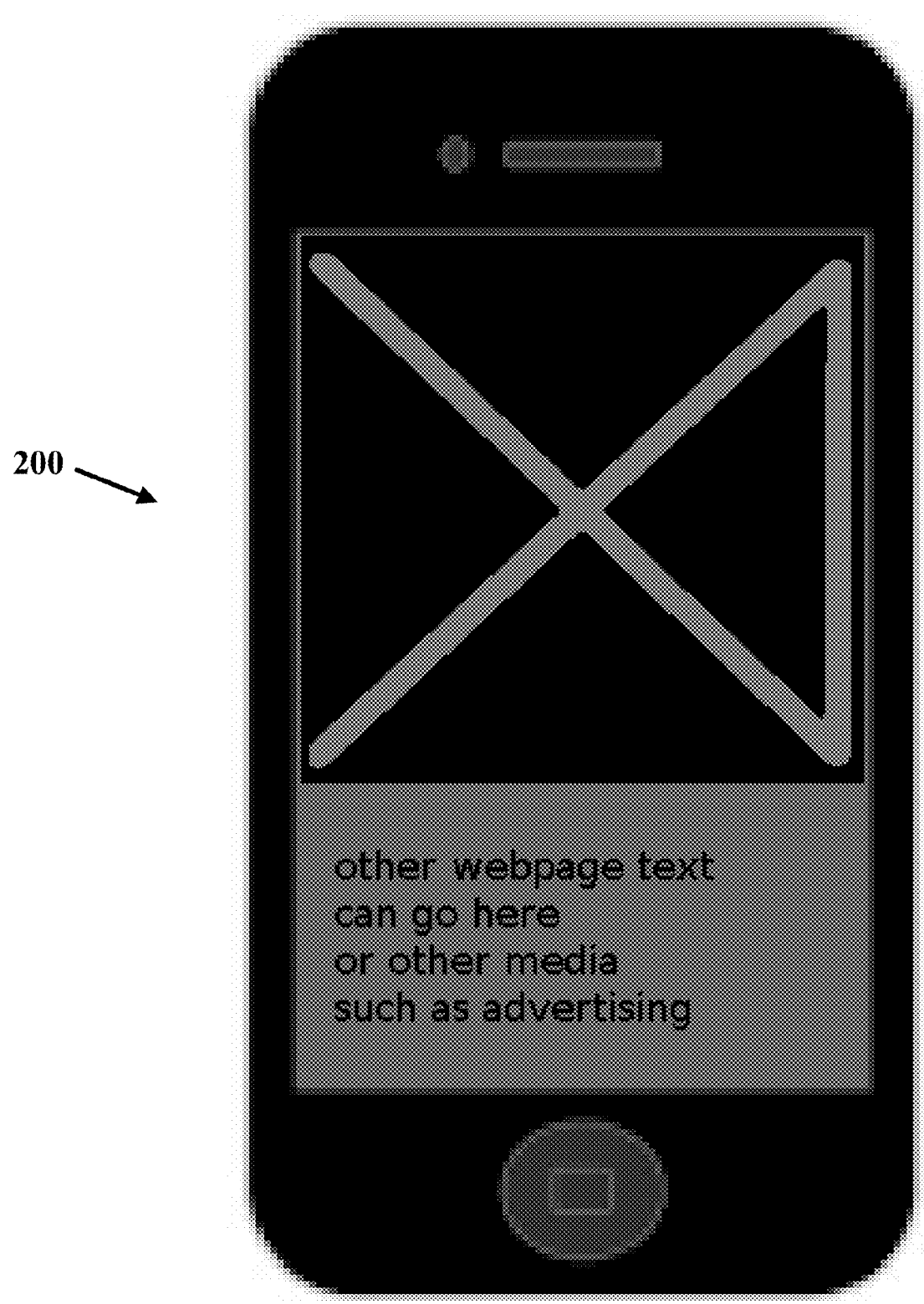
FIG. 2 depicts an example mobile device displaying a webpage with both video playback and other media content on a webpage in an embodiment of the invention.

FIG. 2 depicts an example mobile device 200 displaying a webpage with both video playback and other media content on a webpage. In one embodiment, a live video stream may be broken down into a separate audio stream and a snapshot image stream. The individual data streams may then be converted to, for example, a text based representation of the data. Then, the text may be pushed to a server where listeners (e.g., users) may subscribe and pull the data to their local device. On the user's side, the resulting data may be pieced back together to provide an audio and video experience with other media accompanying the video. On an iOS® device, for example, where in order to watch a video the player is full screen, the techniques described herein may provide video playback with additional other media content. For example, video (e.g., visual) and audio data may be provided while displaying other items on a webpage. The techniques described herein may be used to display video and/or audio of models while providing text and/or interactive media (e.g., advertising).

Figure 3:
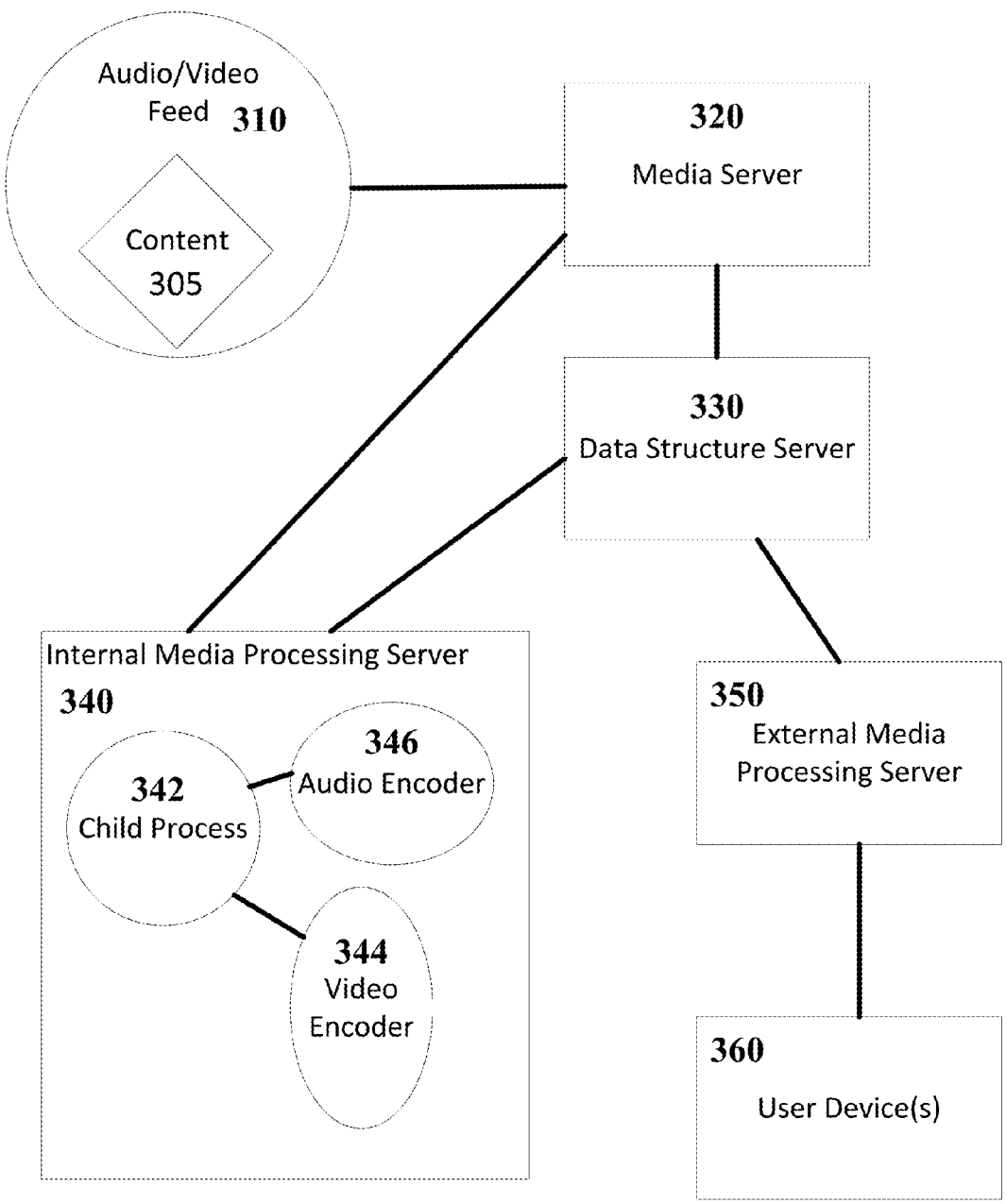
FIG. 3 depicts example servers and processes in an embodiment of the invention.

FIG. 3 depicts example servers and processes in an embodiment of the invention. Example components, servers, and processes of FIG. 3 include content 305, audio/video feed 310, media server 320, data structure server 330, internal media processing server 340, child process 342, video encoder 344, audio encoder 346, external media processing server 350, and one or more user device(s) 360.

Audio/video feed 310 may connect and provide broadcast content 305 to media server 320. Audio/video feed 310 may provide content 305 in a standard video encoding. Content 305 may include a live stream that may include video and audio data. Content 305 may include, for example, a model providing audio and video via a computer.

Media server 320 may be a Wowza® media server, for example. Media server 320 may broadcast content 305. Media server 320 may receive one or more multimedia streams from various audio/video feeds (e.g., broadcasters) and allow the streams to be forwarded (e.g., streamed) to multiple clients. Media server 320 may alter the media stream, allow for authentication of connections, control playback of the stream, etc.

Data structure server 330 may serve the current broadcast mode of audio/video feed 310 (e.g., on or off) and data objects representing content 305. Data structure server 330 may be, for example, a server running Redis®. In one embodiment, content 305 may be pushed to a Redis® server, for example, thru the Redis® server's publish/subscription feature. If, for example, a client is listening on the subscription side, then the client may receive the published content. In one embodiment, media server 320 may send a message to data structure server 330 that a broadcast has started and internal media processing server 340 is listening for that message on data structure server 330. In one embodiment, the publish/subscription feature of data structure server 330 may be ephemeral. Accordingly, if external media processing server 350 is not listening to data structure server 330, then the content data may be lost. In another embodiment, individual data objects representing content 305 may be stored in a relational database (e.g., mysql) and may be stored more permanently. In that embodiment, external media processing server 350 may be programmed with logic to pull the correct data from the relational database, for example.

Internal media processing server 340 may be written in Node.js for example, and may listen to the status change events from the data structure server 330. Internal media processing server 340 may spawn a child process 342 to handle audio/video feed 310 based on the status change events. In an embodiment, for each new content and corresponding audio/video feed, a new child process may be spawned.

Child process 342 may spawn a video encoder 344 (e.g., a Ffmpeg® service for video) and an audio encoder 346 (e.g., a Ffmpeg® service for audio). In one embodiment, video encoder 344 and audio encoder 346 may exist as a single process instead of two separate processes. In one embodiment, the encoders 344/346 (e.g., Ffmpeg®) convert audio/video with raw binary data sent to "standard out" of the encoders 344/346, for example. Child process 342 may listen for data on the video encoder 344 and/or audio encoder 346 stdout and convert raw binary data into a base64 encoded text string, or other encoded string, which represents content data and the text string may be stored in child process 342 (e.g., in an array). Child process 342, video encoder 344, and/or audio encoder 346 may split the video feed into audio and visual portions.

Video encoder 344 may convert the live video stream from audio/video feed 310 into snapshots of individual video frames. The snapshots may be taken, for example, many times per second (e.g., eight times per second). These individual frames of raw data may be converted into a base64 encoded string and stored in one or more buffers in child process 342, for example. In one embodiment, the buffers may be array objects in a programming language. In one embodiment, three buffers may exist. One buffer may store the video (e.g., visual) image data and another buffer may store audio data. The third buffer, an output buffer/array, may be used to store audio and video (e.g., visual) data that is synchronized and put back together before the data is subsequently pushed to data structure server 330. In another embodiment, the three buffers may be the same buffer.

Audio encoder 346 may process the sound from audio/video feed 310 and convert content data to raw audio output such as pulse-code-modulation (PCM). For a given period of time (e.g., 1 second), the audio data may be converted into a base64 encoded string and stored in a buffer in child process 342, for example. In one embodiment, the given period of time may be variable and the variable length of time may be communicated in the data set provided to a browser.

External media processing server 350 may be written in Node.js® for example, and may receive connection requests from one or more user device(s) 360. Each user device 360 may request content 305. External media processing server 350 may listen for data events for the requested content 305 coming from data structure server 330. As external media processing server 350 receives data objects from data structure server 330, external media processing server 350 may push data to user device 360. In one embodiment, external media processing server 350 may use Apache®. In one embodiment, user device 360 may connect to external media processing server 350, which may then request data from data structure server 330 and may then send data to user device(s) 360. In one embodiment, the publish/subscription feature of data structure server 330 (which may be ephemeral in nature) may be used so that when an external media server 350 connects to data structure server 330, any data received by external media server 350 is then pushed down to the connected user device 360. If, for example, there is no data on data structure server 330, then external media server 350 pushes nothing to user device 360.

User device(s) 360 could be one or more devices such as mobile devices, for example, an Apple iPhone® running iOS®. User device(s) 360 may be capable of displaying video and outputting audio and displaying images. User device(s) 360 may receive data from external media processing server 350 and may process the received data. User device(s) 360 may convert the received sound text string to a known audio format and output audio. User device(s) 360 may convert the received video (e.g., visual) text string into a series of consecutive displayable images.

Although the media server 320, data structure server 330, internal media processing server 340, child process 342, video encoder 344, audio encoder 346, and external media processing server 350 are shown separately, in an embodiment of the invention, these components could be consolidated into one or more server devices.

Figure 4:
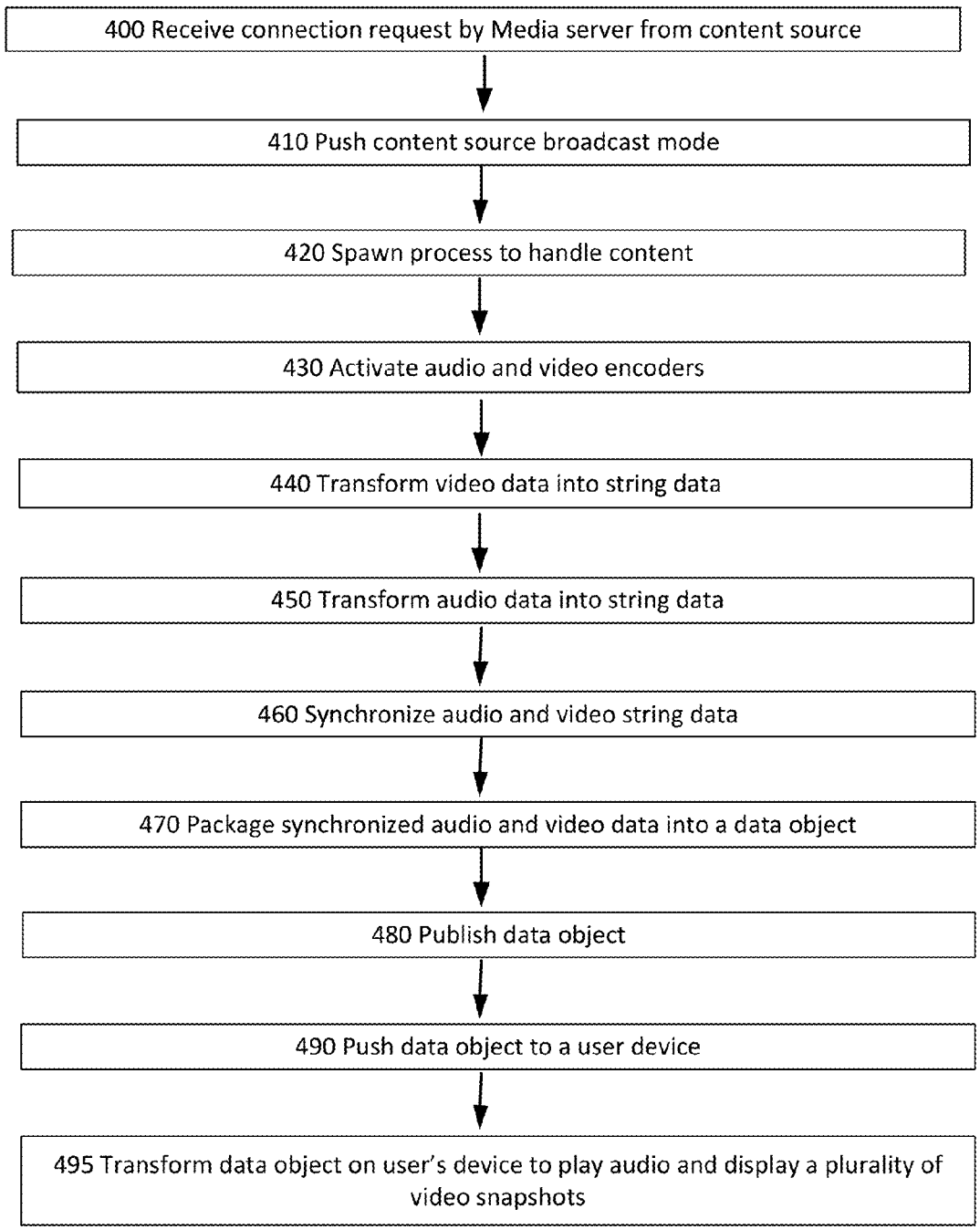
FIG. 4 depicts an example workflow of an embodiment of the invention.

FIG. 4 depicts an example workflow of an embodiment of the invention. In 400, media server 320 may receive a connection request from content 305 and/or audio/video feed 310. For example, a model may broadcast content 305 via audio/video feed 310 and connect to media server 320. In one embodiment, media server 320 may push the content to other media servers to serve the live stream to clients or media server 320 may accept a plurality of clients directly to serve the live stream. From 400, flow may move to 410.

In 410, media server 320 may push the current broadcast mode of the content source to data structure server 330. When a content source (e.g., a model) changes broadcast modes (e.g., broadcasting or not-broadcasting) the media server 320 may publish to data structure server 330 (e.g., a server running Redis®) the new mode of the content source. In one embodiment, different content states may be pushed that are tied to the broadcast mode that content 305 may be in (e.g., free chat, paid chat, etc.). However, the various content states may not influence or change the broadcast mode (e.g., either broadcasting or not-broadcasting).

In one embodiment, the setup broadcasting mode may not be saved, instead the publish/subscribe model may be used. For example, media server 320 may publish a message to data structure server 330. Internal media processing server 340 may be listening to data structure server 330 and may see the message. If internal media processing server 340 is not listening then the broadcasting mode may not be received by anyone and may be lost. The publish/subscribe feature of data structure server 330 may push text strings to other servers. From 410, flow may move to 420.

In 420, a process may be spawned to handle content 305. For example, internal media processing server 340 may listen to the broadcast mode change events. When a broadcast mode change is detected (e.g., broadcasting is now on), and content 305 via audio/video feed 310 is broadcasting through media server 320, internal media processing server 340 may spawn child process 342 to handle the media stream. In one embodiment, child process 342 is not spawned but remains a part of a parent process. Internal media processing server 340 may get the change of broadcast mode from data structure server 330 and then internal media processing server 340 may connect to the media stream located on media server 320. In an embodiment, internal media processing server 340 does not directly connect to source audio/video feed 310 (e.g., a model's computer). From 420, flow may move to 430.

In 430, audio and video encoders may be activated. Child process 342 may start up one or more video/audio encoders (e.g., video encoder 344 and audio encoder 346). For example, 2 Ffmpeg® processes may be started, one for video (e.g., visual data) and one for audio. Media that is in a standard video encoding (e.g., MPEG-2, MPEG-4, MMV, VP#, etc.) may be separated into visual and audio components at a known sample rate. From 430, flow may move to 440.

In 440, video data may be transformed into string data. Video encoder 344 may convert the live video stream content from a video portion of audio/video feed 310 into a plurality of snapshots of individual frames of video for a given time period (e.g., 8 snapshots of video per second). In one embodiment, the number of snapshots and given length of time may be variable and these values may be communicated to the browser in a dataset. The individual frames of raw video data may be converted into a base64 encoded string and the string may be stored in a buffer in child process 342. From 440, flow may move to 450.

In 450, audio data may be transformed into string data. Audio encoder 346 may process the sound content from the audio portion of the audio/video feed 310 to a raw audio output (e.g., Pulse-Code Modulation (PCM), AES3, etc.). Based on the sampling rate and a given amount of time (e.g., 1 second), child process 342 may take X number of bytes (corresponding to the given amount of time) and convert the audio bytes into a base64 encoded string and store the audio string in a buffer in child process 342. From 450, flow may move to 460.

In 460, the separate audio and video string data may be synchronized. The audio channel may be used as a "clock" to match up the snapshots from the video encoder process to keep the audio and video in synchronization with respect to the timeline of the original video media. For example, audio may be sampled at 44100 kHz (or other predetermined value), which means that a specific number of bytes (X) are created every second. When the child process 342 listens for output from audio encoder 346, the child process 342 will input up to that specific number of bytes and then process those bytes. The timer may then be X number, for example every time X number of bytes are processed. Any snapshots created during the time between the last audio processing waiting for X number of bytes to be received may be considered to have been from the same time as that audio data. From 460, flow may move to 470.

In 470, synchronized audio and video data may be packaged into a data object. For example, at time 0 a snapshot buffer may have no frames in it and an audio buffer with no audio frames in it. As video snapshots are processed they are pushed on to the snapshot buffer. Once the audio sample pulls, for example, 1 second of sound, the current snapshots in the snapshot buffer (the base64 encoded strings) are also pulled and the snapshot buffer is cleared. The audio sample (e.g., base64 encoded string of 1 second of audio) and the snapshots (e.g., 8 images) may be packaged together as one data object of text strings. From 470, flow may move to 480.

In 480, the data object of text strings may be published to data structure server 330 (e.g., a server running Redis® with the publish/subscribe feature). From 480, flow may move to 490.

In 490, the data object may be pushed to user device(s) 360. One or more users may connect to external media processing server 350. When a user connects, external media processing server 350 may listen for the data events coming from data structure server 330. As external media processing server 350 receives the data events, it pushes the data object to user device(s) 360. A browser on the user device(s) 360 may receive the data object. From 490, flow may move to 495.

In 495, the data object may be transformed on the user device(s) 360 to play audio and to display a plurality of video snapshots. For example, when the data object is received by user device(s) 360, user device(s) 360 may process the data object for audible and visual presentation to the user. The expected start and end times of audio and video may be synchronous, but there may be different delays to start playing audio/video between the implementation of the two types of media. This delay may be measured when the end of each chunk finishes and this measurement may be used to set a delay on the start event of subsequent chunks to improve synchronicity. The data packets received are composed of individual discrete units of audio and video (e.g., 1 second of sound and 8 image snapshots). In one embodiment, the data packets may include a JSON text string which may be a text based representation of a data object. The JSON text string may be parsed by front-end (e.g., client side) JavaScript to transform back into a data object. The data object may be an array with the first element being the text string representation of the 1 second of audio and the second element being another array of 8 image snapshot text string. The audio may be processed by using, for example, Web Audio API or standard features of modern browsers to convert the sound text string to a playable sound. At the same time, a video snapshot is used to update the source attribute of an html image tag to the base64 encoded string. In addition to an html image tag, html canvas or some other mechanism with which to display visual content in a browser may be used. The source attribute is updated while the audio plays. For example, if 8 snapshot images a second were taken, the source would be changed 8 times a second, once for each image. The constant updating of the source image simulates video. A sample object that is received by the browser as a JSON text string is shown below:

["<audio text>", ["<snap shot 1>", "<snapshot 2>", . . . ]]

As long as data is being received by user device(s) 360, sound is outputted and the snapshots are being updated, creating a live video and audio stream that does not require full screen on an iOS® device.

Embodiments of the invention may not be limited to streaming media. For example, an embodiment could be static advertising content that is pre-disassembled and delivered to the browser, without the use of media server 320. For example, the steps to separate the video and audio or prerecorded content (e.g., a traditional video advertisement) into separate components for the duration of the video may be done ahead of time, prior to content transmission to one or more receiving devices. In an embodiment, the separate the video and audio or prerecorded content may be stored on computer media such as a database, hard drive file system, or in-memory document storage. For example, the content may be embedded directly into the JavaScript source of a web page. The JavaScript on the web page may render the pre-built data, instead of streaming the data from a server.

Illustrative Computer System

Figure 5:
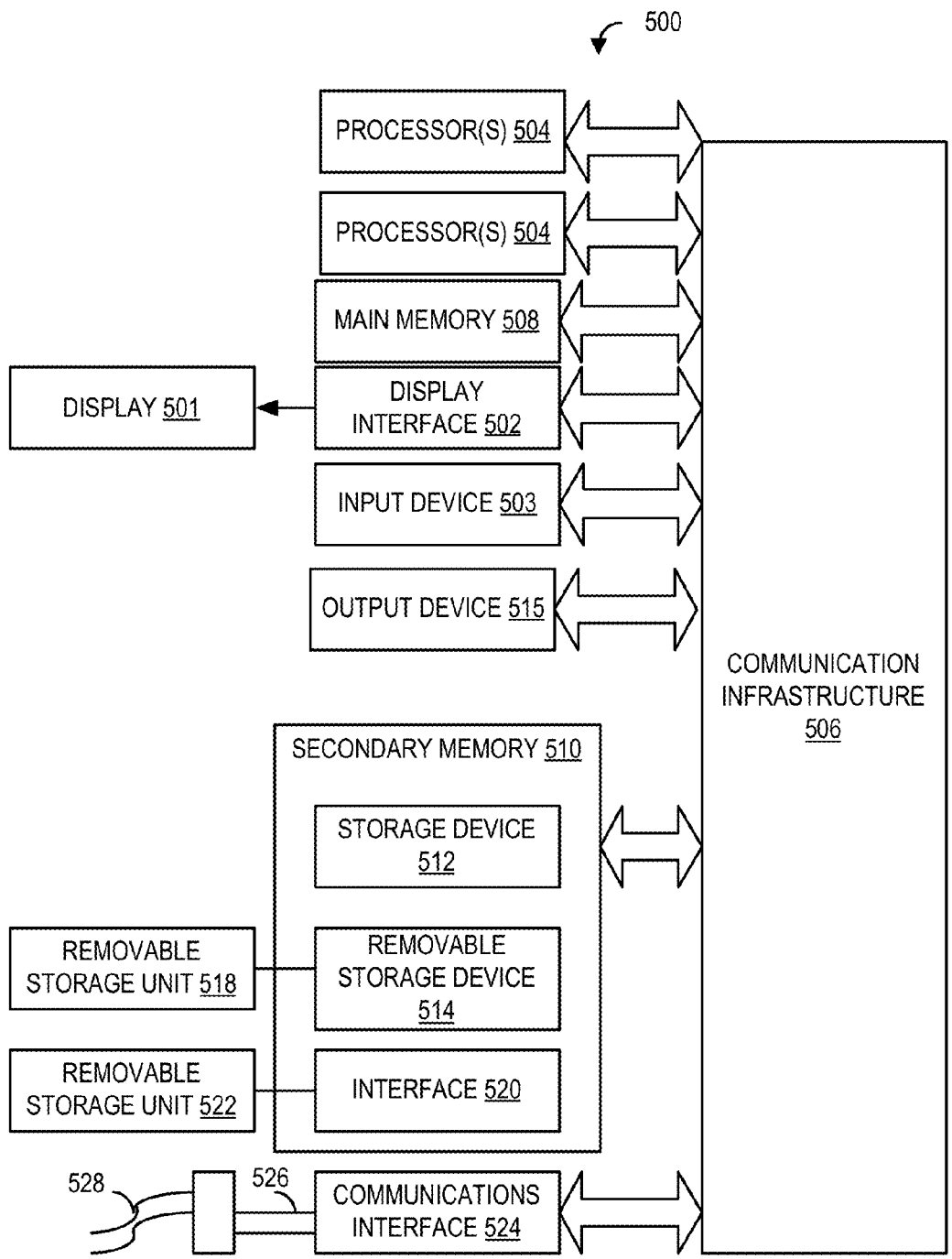
FIG. 5 depicts an example computer system that may be used in implementing an illustrative embodiment of the invention.

FIG. 5 depicts an illustrative computer system that may be used in implementing an illustrative embodiment of the invention. Specifically, FIG. 5 depicts an illustrative embodiment of a computer system 500 that may be used in computing devices such as, e.g., but not limited to, stand-alone or client or server devices. FIG. 5 depicts an illustrative embodiment of a computer system that may be used as client device, or a server device, etc. An embodiment of the invention (or any part(s) or function(s) thereof) may be implemented using hardware, software, firmware, or a combination thereof and may be implemented in one or more computer systems or other processing systems. In fact, in an illustrative embodiment, the invention may be directed toward one or more computer systems capable of carrying out the functionality described herein. An example of a computer system 500 is shown in FIG. 5, depicting an illustrative embodiment of a block diagram of an illustrative computer system useful for implementing an embodiment of the invention. Specifically, FIG. 5 illustrates an example computer 500, which in an illustrative embodiment may be, e.g., (but not limited to) a personal computer (PC) system running an operating system such as, e.g., (but not limited to) MICROSOFT® WINDOWS® NT/98/2000/XP/Vista/Windows 7/Windows 8, etc. available from MICROSOFT® Corporation of Redmond, Wash., U.S.A. or an Apple computer executing MAC® OS or iOS® from Apple® of Cupertino, Calif., U.S.A. However, the invention is not limited to these platforms. Instead, an embodiment of the invention may be implemented on any appropriate computer system running any appropriate operating system. In an illustrative embodiment, the invention may be implemented on a computer system operating as discussed herein. An illustrative computer system, computer 500 is shown in FIG. 5. Other components of the invention, such as, e.g., (but not limited to) a computing device, a communications device, a telephone, a personal digital assistant (PDA), an iPhone®, a 3G/4G wireless device, a Windows Mobile device, an Android device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a computer such as that shown in FIG. 5. In an illustrative embodiment, services may be provided on demand using, e.g., an interactive television device (iTV), a video on demand system (VOD), via a digital video recorder (DVR), and/or other on demand viewing system. Computer system 500 may be used to implement the network, servers, and components as described in FIG. 3 (e.g., media server 320, data structure server 330, internal media processing server 340, external media processing server 350, and/or user device(s) 360). As well as the mobile devices shown in FIGS. 1 and 2.

The computer system 500 may include one or more processors, such as, e.g., but not limited to, processor(s) 504. The processor(s) 504 may be connected to a communication infrastructure 506 (e.g., but not limited to, a communications bus, cross-over bar, interconnect, or network, etc.). Processor 504 may include any type of processor, microprocessor, or processing logic that may interpret and execute instructions (e.g., for example, a field programmable gate array (FPGA)). Processor 504 may comprise a single device (e.g., for example, a single core) and/or a group of devices (e.g., multi-core). The processor 504 may include logic configured to execute computer-executable instructions configured to implement one or more embodiments. The instructions may reside in main memory 508 or secondary memory 510. Processors 504 may also include multiple independent cores, such as a dual-core processor or a multi-core processor. Processors 504 may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention using other computer systems and/or architectures.

Computer system 500 may include a display interface 502 that may forward, e.g., but not limited to, graphics, text, and other data, etc., from the communication infrastructure 506 (or from a frame buffer, etc., not shown) for display on the display unit 501. The display unit 501 may be, for example, a television, a computer monitor, or a mobile phone screen. The output may also be provided as sound through a speaker.

The computer system 500 may also include, e.g., but is not limited to, a main memory 508, random access memory (RAM), and a secondary memory 510, etc. Main memory 508, random access memory (RAM), and a secondary memory 510, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory 510 may include, for example, (but is not limited to) a hard disk drive 512 and/or a removable storage drive 514, representing a floppy diskette drive, a magnetic tape drive, an optical disk drive, a compact disk drive CD-ROM, flash memory, etc. The removable storage drive 514 may, e.g., but is not limited to, read from and/or write to a removable storage unit 518 in a well-known manner. Removable storage unit 518, also called a program storage device or a computer program product, may represent, e.g., but is not limited to, a floppy disk, magnetic tape, optical disk, compact disk, etc. which may be read from and written to removable storage drive 514. As will be appreciated, the removable storage unit 518 may include a computer usable storage medium having stored therein computer software and/or data.

In alternative illustrative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 522 and interfaces 520, which may allow software and data to be transferred from the removable storage unit 522 to computer system 500.

Computer 500 may also include an input device 503 which may include any mechanism or combination of mechanisms that may permit information to be input into computer system 500 from, e.g., a user. Input device 503 may include logic configured to receive information for computer system 500 from, e.g. a user. Examples of input device 503 may include, e.g., but not limited to, a mouse, pen-based pointing device, or other pointing device such as a digitizer, a touch sensitive display device, and/or a keyboard or other data entry device (none of which are labeled). Other input devices 503 may include, e.g., but not limited to, a biometric input device, a video source, an audio source, a microphone, a web cam, a video camera, and/or other camera. Content 305 may be created via web camera or other camera.

Computer 500 may also include output devices 515 which may include any mechanism or combination of mechanisms that may output information from computer system 500. Output device 515 may include logic configured to output information from computer system 500. Embodiments of output device 515 may include, e.g., but not limited to, display 501, and display interface 502, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Computer 500 may include input/output (I/O) devices such as, e.g., (but not limited to) input device 503, communications interface 524, cable 528 and communications path 526, etc. These devices may include, e.g., but are not limited to, a network interface card, and/or modems.

Communications interface 524 may allow software and data to be transferred between computer system 500 and external devices.

In this document, the terms "computer program medium" and "computer readable medium" may be used to generally refer to tangible, non-transitory media such as, e.g., but not limited to, removable storage drive 514, a hard disk installed in hard disk drive 512, memory unit, flash memories, removable discs, non-removable discs, etc. In addition, it should be noted that a computer-readable medium that comprises computer-executable instructions for execution in a processor may be configured to store various embodiments of an embodiment of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may. The various embodiments described herein may be combined and/or features of the embodiments may be combined to form new embodiments.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product, such as, for example, a scientific modeling product. It may be downloadable from a network, for example, a website, as a stand-alone product or as an add-in package for installation in an existing software application. It may also be available as a client-server software application, or as a web-enabled software application. One or more computers may be specialized by storing programming logic that enables one or more processors to perform the techniques indicated herein and the steps of, for example, FIG. 4. Computer system 500 or multiple embodiments of computer system 500 may be used to perform the functions of, for example, user device 360, media server 320, data structure server 330, internal media processing server 340, and/or external media processing server 350.

While various embodiments of the invention have been described above, it should be understood that they have been presented by way of example only, and not limitation. Thus, the breadth and scope of the invention should not be limited by any of the above-described illustrative embodiments, but should instead be defined only in accordance with the following claims and their equivalents. The embodiments of the invention that have been described above may contain features that may be removed or combined between the described embodiments to derive additional embodiments.

What is claimed is:

1. A system for providing media content comprising:
   a media server configured to receive and broadcast an audio/video stream from one or more audio and video sources;
   a data structure server in communication with the media server, the data structure server configured to publish a broadcast state for the one or more audio and video sources;
   an internal server in communication with the data structure server and the media server, the internal server configured to receive the audio/video stream from the media server, the internal server comprising one or more processors configured to:
   separate visual data and audio data from the audio/video stream,
   transform, for a given period of time, the audio data into a first string,
   extract, for the given period of time, a plurality of snapshots from the visual data,
   transform the plurality of snapshots into a second string,
   package the first string and the second string into a data object, wherein the audio of the first string and the snapshots of the second string are synchronized in time, and
   transmit the data object to the data structure server, wherein the data structure server publishes the data object; and
   an external server in communication with the data structure server, the external server configured to respond to a request from one or more user devices, a response including the data object and browser executable instructions to:
   transform the first string to a playable sound,
   transform the second string to consecutively display snapshots from the plurality of snapshots in a browser, wherein each of the displayed snapshots is synchronized with the playable sound, and
   display second media content along with the plurality of snapshots in the browser.

2. The system of claim 1, wherein the first string and the second string are base64 encoded.

3. The system of claim 1, further comprising spawning, by the internal server, a separate process for each of the one or more audio and video sources.

4. The system of claim 1, wherein the given period of time is 1 second.

5. The system of claim 1, wherein plurality of snapshots is 8 snapshots.

6. The system of claim 1, wherein the browser executable instructions update a source attribute of an html image tag to one or more pieces of the second base64 encoded string.

7. The system of claim 1, wherein the browser displays a series of snapshots from the plurality of snapshots, wherein the series of snapshots are synchronized with the playable sound to resemble video playback.

8. The system of claim 1, wherein the one or more audio and video sources includes video and audio from a model.

9. The system of claim 1, wherein the one or more user devices cannot display video and the second media content at a same time in the browser.

10. The system of claim 1, wherein the second media content includes text or advertising.

11. A method for providing media content, the method comprising:
    receiving, by a media server, a connection request and content data from a content source;
    transmitting, by the media server, a broadcast state to a data structure server;
    publishing, by the data structure server, the broadcast state;
    transmitting, by the media server, the content data to an internal server;
    splitting, by the internal server, the content data into audio data and visual data;
    transforming, by the internal server, the audio data into a first string for a length of time;
    extracting, by the internal server, a plurality of snapshots from the visual data over the length of time;
    transforming, by the internal server, the plurality of snapshots into a second string;

packaging, by the internal server, the first string and the second string into a data object, wherein audio of the first string and the snapshots of the second string are synchronized in time;

publishing, by the data structure server, the data object, wherein the data object is accessible by an external server, wherein the external server is accessible by one or more user devices; and pushing, by an external server, a response to a request from one or more user devices, wherein the response includes the data object and browser executable instructions to:
 transform the first string to a playable sound,
 transform the second string to consecutively display snapshots from the plurality of snapshots in a browser, wherein each of the displayed snapshots is synchronized with the playable sound, and
 display second media content along with the plurality of snapshots in the browser.

12. The method of claim 11, wherein the content data includes an audio and video stream.

13. The method of claim 11, wherein the first string and second string are base64 encoded.

14. The method of claim 11, further comprising spawning, by the internal server, a separate process for each content source.

15. The method of claim 11, wherein the length of time is 1 second.

16. The method of claim 11, wherein plurality of snapshots is 8 snapshots.

17. The method of claim 11, wherein the browser executable instructions update a source attribute of an html image tag to one or more pieces of the second base64 encoded string.

18. The method of claim 11, wherein the browser displays a series of snapshots from the plurality of snapshots, wherein the series of snapshots are synchronized with the playable sound to resemble video playback.

19. The method of claim 11, wherein the second media content includes text or advertising.

20. A non-transitory computer-readable medium comprising instructions executable by one or more processors, the instructions to:
 receive a connection request and content data from a content source;
 transmit a broadcast state to a data structure server;
 publish the broadcast state;
 transmit the content data to an internal server;
 split by the internal server, the content data into audio data and visual data;
 transform by the internal server, the audio data into a first string for a length of time;
 extract by the internal server, a plurality of snapshots from the visual data over the length of time;
 transform by the internal server, the plurality of snapshots into a second string;
 package by the internal server, the first string and the second string into a data object, wherein audio of the first string and the snapshots of the second string are synchronized in time;
 publish by the data structure server, the data object, wherein the data object is accessible by an external server, wherein the external server is accessible by one or more user devices; and
 push by an external server, a response to a request from one or more user devices, wherein the response includes the data object and browser executable instructions to:
 transform the first string to a playable sound,
 transform the second string to consecutively display snapshots from the plurality of snapshots in a browser, wherein each of the displayed snapshots is synchronized with the playable sound, and
 display second media content along with the plurality of snapshots in the browser.

* * * * *